US010281552B2

(12) United States Patent
Augustyn

(10) Patent No.: US 10,281,552 B2
(45) Date of Patent: May 7, 2019

(54) METHOD, SYSTEM, AND APPARATUS FOR RAPIDLY MEASURING INCIDENT SOLAR IRRADIANCE ON MULTIPLE PLANES OF DIFFERING ANGULAR ORIENTATIONS

(71) Applicant: Augustyn + Company, Berkeley, CA (US)

(72) Inventor: James Raymond Augustyn, Berkeley, CA (US)

(73) Assignee: AUGUSTYN + COMPANY, Berkeley, CA (US)

(*) Notice: Subject to any disclaimer, the term of this patent is extended or adjusted under 35 U.S.C. 154(b) by 0 days.

(21) Appl. No.: 15/987,618

(22) Filed: May 23, 2018

(65) Prior Publication Data

US 2018/0341002 A1 Nov. 29, 2018

Related U.S. Application Data

(60) Provisional application No. 62/510,566, filed on May 24, 2017.

(51) Int. Cl.
*G01S 3/786* (2006.01)
*H02S 20/32* (2014.01)

(52) U.S. Cl.
CPC ............ *G01S 3/7861* (2013.01); *H02S 20/32* (2014.12)

(58) Field of Classification Search
CPC ...... G01J 1/0252; G01J 1/0266; G01J 1/0271; G01J 2001/0653; G01J 2001/067
USPC .............................................. 250/203.4, 239
See application file for complete search history.

(56) References Cited

U.S. PATENT DOCUMENTS

| | | | | |
|---|---|---|---|---|
| 4,404,465 A | * | 9/1983 | Miller | G01S 3/7861 250/203.4 |
| 8,981,272 B2 | * | 3/2015 | Armstrong | G01J 1/42 250/203.4 |
| 2006/0017720 A1 | | 1/2006 | Li | |
| 2009/0079987 A1 | | 3/2009 | Ben-ezra et al. | |
| 2013/0314699 A1 | * | 11/2013 | Jungerman | G01J 1/0266 356/139.01 |

FOREIGN PATENT DOCUMENTS

| | | |
|---|---|---|
| RU | 162878 U1 | 6/2016 |
| WO | 2010057138 A2 | 5/2010 |

* cited by examiner

*Primary Examiner* — Kevin K Pyo
(74) *Attorney, Agent, or Firm* — Perkins Coie LLP

(57) ABSTRACT

Certain aspects of the technology disclosed herein include measuring and reporting the unit planar area incident radiant flux striking multiple planes at known, determined angles of tilt from the horizontal and pre-determined angles of azimuthal orientation corresponding to that of an associated solar power generating apparatus which employs a single axis or two axis photovoltaic module tracking design.

25 Claims, 12 Drawing Sheets

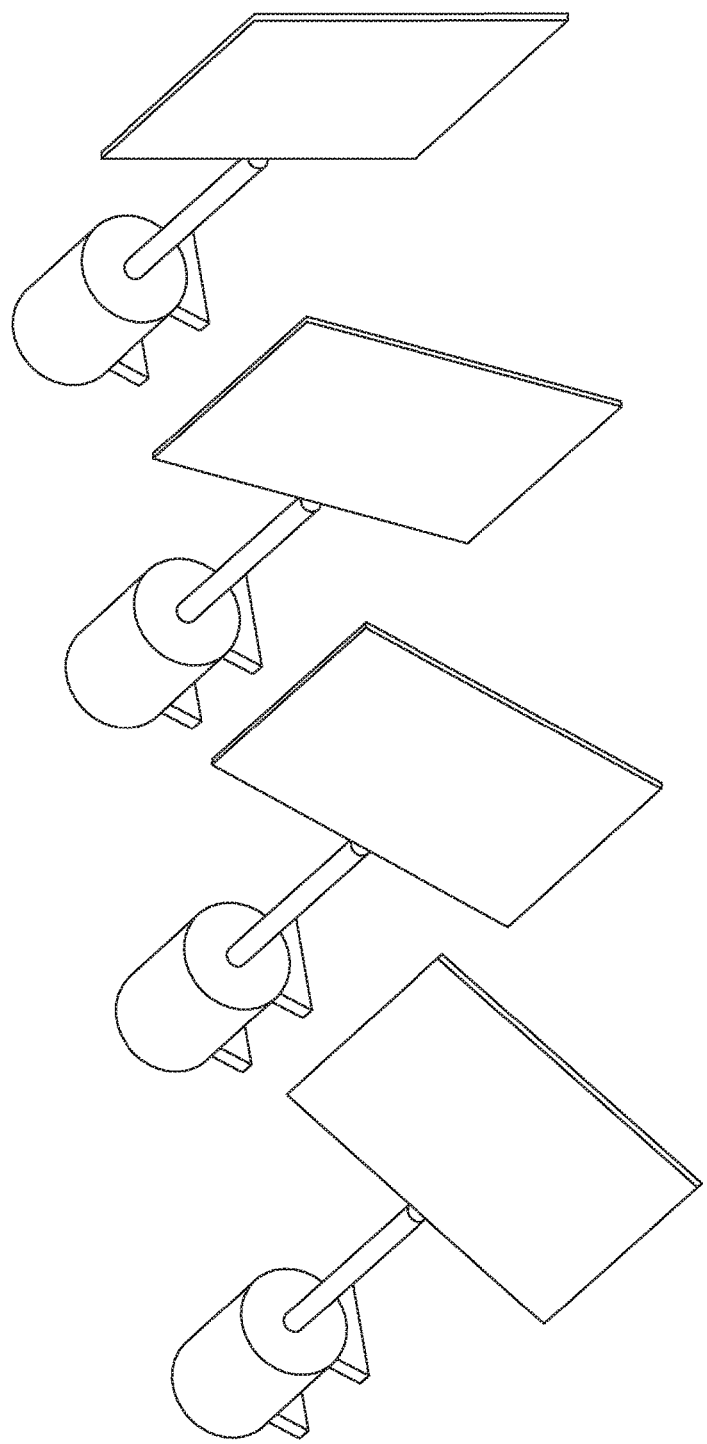

METHOD, SYSTEM, AND APPARATUS FOR RAPIDLY MEASURING INCIDENT SOLAR IRRADIANCE ON MULTIPLE PLANES OF DIFFERING ANGULAR ORIENTATIONS

CROSS-REFERENCE TO RELATED APPLICATIONS

This application claims the benefit of U.S. Provisional Patent Application No. 62/510,566, filed May 24, 2017, which is incorporated by reference herein in its entirety.

TECHNICAL FIELD

The present application is related to measuring solar irradiance, and more specifically to rapidly measuring incident solar irradiance on planes oriented at multiple angles.

BACKGROUND

Photovoltaic solar power systems often employ a means to adjust the photovoltaic module tilt with respect to a horizontal plane in response to changes in sun position throughout the day. This is done by adjusting the photovoltaic module tilt angle continuously or at frequent intervals to maximize the total radiant flux striking the active module surfaces, thereby maximizing plant electric output and financial revenue.

A common and effective design technique to achieve this end is the single axis tracking mount configuration for larger scale photovoltaic power generation facilities. This technique typically employs rows of multiple modules fixed in a common plane to a rotatable shaft, whose axis of rotation is usually oriented along a horizontal, north/south axis. An integral drive mechanism enables rotational adjustment of the shaft and thereby the tilt angle of the attached modules in each row throughout the day to maximize power production.

The target tilt angle in these designs is often calculated using generally accepted sun position algorithms based on astronomical calculations for the location of interest to determine the tilt angle from horizontal of a plane containing both the rotational axis of the tracking mechanisms and the center of the sun. Such an alignment technique typically minimizes the angle of incidence of direct beam solar irradiance striking a perpendicular to the front surface of the modules.

BRIEF DESCRIPTION OF THE DRAWINGS

FIGS. 3G-3J illustrate another irradiance sensor oriented in a plurality of directions, according to an embodiment.

Figure 1:
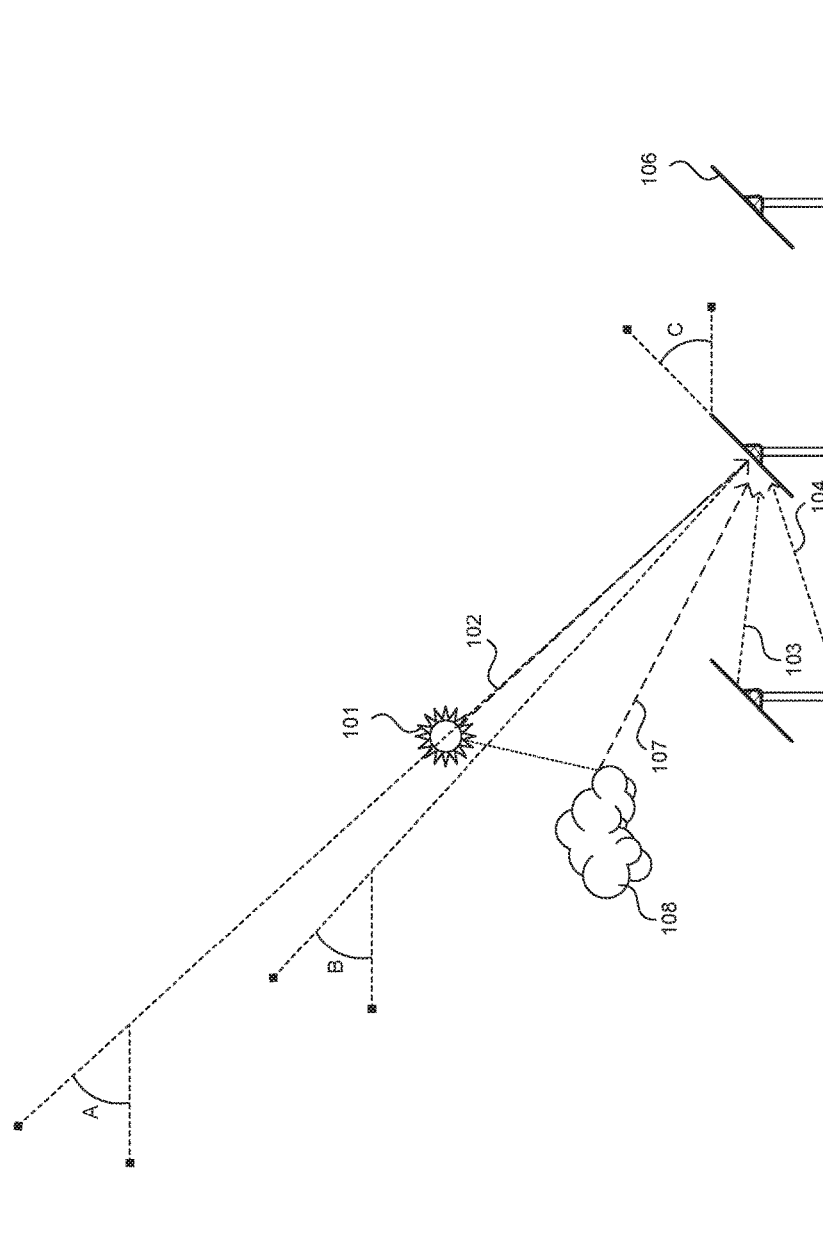
FIG. 1 illustrates paths of irradiance incident upon a photovoltaic module, according to an embodiment.

The figures depict various embodiments of this disclosure for purposes of illustration only. One skilled in the art can readily recognize from the following discussion that alternative embodiments of the structures and methods illustrated herein can be employed without departing from the principles of the invention described herein.

DETAILED DESCRIPTION

Conventional methods for selecting a tilt angle for single-axis tracking photovoltaic modules or arrays use astronomical calculation-based algorithms to determine sun position. Once the sun position is determined, the modules are tilted or moved to an angular position to maximize the projection of direct beam solar irradiance onto the plane of the module(s). However, this technique considers only the direct beam solar irradiance striking the front surface of the modules without accounting for non-direct irradiance striking the face of the module via diffuse sky refraction and reflection, and from reflections from the ground or objects within the field of view of the module. In some cases, estimation of diffuse sky irradiance input and that from ground and adjacent object reflectances is attempted using diffuse sky modeling techniques. However such inherently inaccurate techniques fail to account for varying and possibly asymmetric atmospheric radiant transmission or ground reflectance of radiation reaching a solar module due to dynamic atmospheric composition, weather transients and/or localized human or other activities. The non-homogeneity of the amount of radiation arriving from various portions of a spherical or hemispherical field of view of the modules, due to reflection and refraction from clouds, aerosols, or other atmospheric constituents, combined with that arriving from reflection or radiative exchange with the ground or other objects within the field of view of the active module surfaces, when at non-horizontal tilts, can have significant effect on the total irradiance striking the module plane. Such effects may often result in the tilt angle receiving the maximum hemispherically incident planar irradiance being significantly different than that calculated by sun position alone with or without consideration of the modeled diffuse sky and ground-reflected irradiance inputs.

In addition, conventional methods considering sun-position alone are incapable of effectively selecting an optimum tilt angle for bi-facial solar modules, since only a single plane can be identified as being directed toward sunlight. Such methods cannot be used to select a tilt angle for a bi-facial solar module having two opposite radiant energy accepting planes. Even attempts to use theoretical models of diffuse sky and ground reflected irradiance distributions lack the accuracy of the disclosed technique for these purposes.

By employing the disclosed technique, all sources of radiation incident from all relevant directions are accounted for to enable selection of optimum orientation of bi-facial solar modules based on direct physical measurement of the total hemispherically incident solar irradiance striking both active module planes.

The presently disclosed technology overcomes the deficiencies in conventional methods by rapidly measuring incident planar irradiance at multiple angles of tilt corresponding to the full range of tilt angles achievable by the tracking arrays used by an adjacent solar power plant. The set of multiple measured irradiances and associated tilt angles captured during each operating cycle contains both the irradiance corresponding to the plant's current common module tilt angle as well as the tilt angle of maximum planar incident irradiance. The current and recent historical set of such measurements also provides relevant input to predictive models of near term future estimates of the optimum tracker tilt angle.

The orientation and tilt of the plane which receives the maximum incident radiant flux from sun, sky, and ground albedo at any moment in time can be determined by performing measurements of incident irradiance onto surfaces of multiple different tilt angles. The determined maximum incident radiant flux can be used to maximize electric power generation at photovoltaic solar power plants employing, for example, either single or dual axis tracking and single and/or bi-facial photovoltaic module technologies.

In an embodiment, any of a variety of radiative flux-detecting sensor types such as a photodiode pyranometer or photometer, a fast-response thermopile pyranometer, a photovoltaic reference cell, a photovoltaic module, or any combination thereof may be used. The sensor can be coupled to a rotation device configured to physically alter the sensor's angle of tilt from the horizontal, as measurements are taken. The sensor can be coupled with a computing device configured to determine and associate each discrete irradiance measurement to the angle of tilt at which it is captured.

In an embodiment, an array of multiple individual sensors can be permanently mounted and oriented to measure radiant flux at different planar tilt angles. Such a configuration may employ an automatic cleaning system and/or transparent enclosure to protect the sensor array from uneven soiling and deterioration due to general weathering.

These and other objects, features and characteristics of the present disclosure will become more apparent to those skilled in the art from a study of the following detailed description in conjunction with the appended claims and drawings, all of which form a part of this specification.

FIG. 1 illustrates paths of irradiance incident upon a photovoltaic module. FIG. 1 is illustrated from a perspective along the rotational axis of the tracking rows of photovoltaic modules (e.g., including photovoltaic module 106). Multiple possible paths (including paths 102, 103, 104, and/or 107) of radiation incident upon a photovoltaic module mounted on a tracking array (e.g., a single tracking array) are shown. These paths include direct beam irradiance from the sun (path 102), reflection from the ground and from ground mounted objects (e.g., paths 103 and 104) within the field of view of the photovoltaic modules, and reflection and refraction from clouds (e.g., path 107), and atmospheric aerosols and particles within the field of view of the photovoltaic modules (not shown). Angle C is the tilt angle of highest incident irradiance on the active plane of the module. Angle C equals Angle A if the module is aligned to the current sun position 101. Angle C equals Angle B if a higher incident irradiance would result if the modules were aligned to an alternate tilt angle determined by measurements of one embodiment of the invention. Various embodiments of the invention are described below with reference to FIGS. 2-10.

Figure 2:
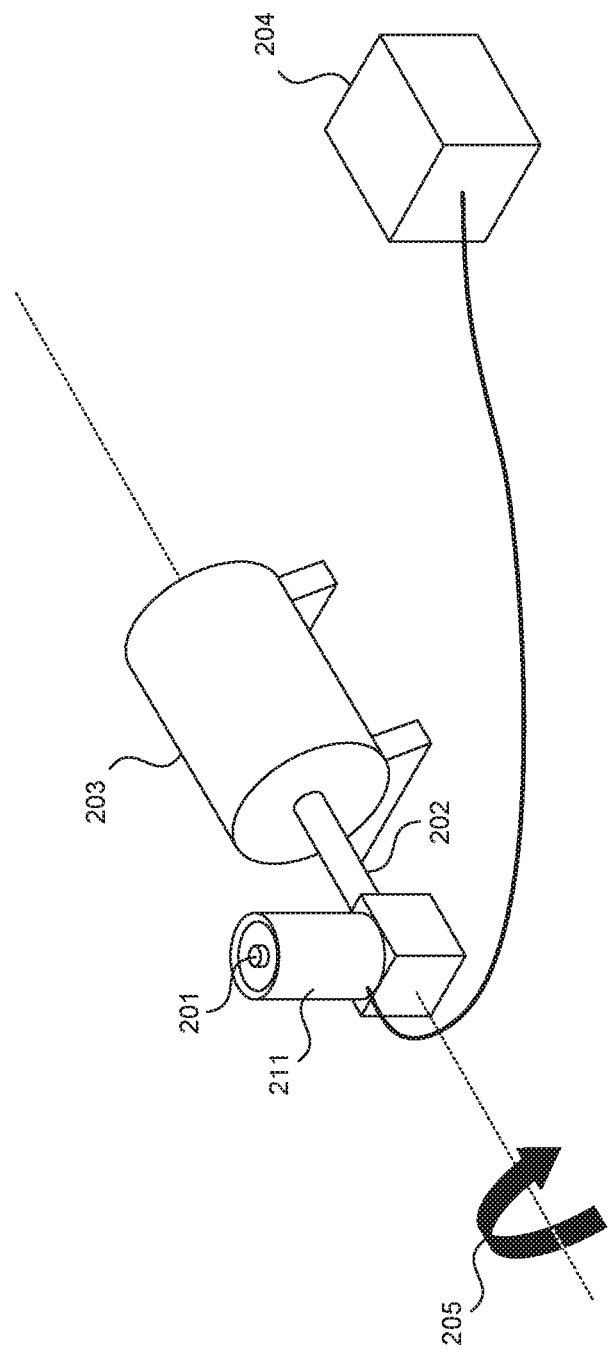
FIG. 2 illustrates a photodiode irradiance sensor affixed to a rotational shaft and connected to a signal measurement and processing module, according to an embodiment.
Figure 3C:
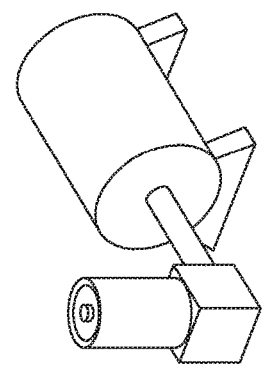
FIGS. 3A-3F illustrate the photodiode irradiance sensor of FIG. 2 oriented in a plurality of directions, according to an embodiment.
Figure 3F:
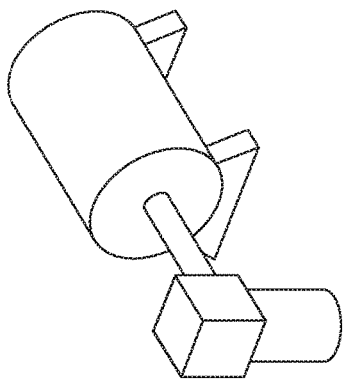
Figure 3B:
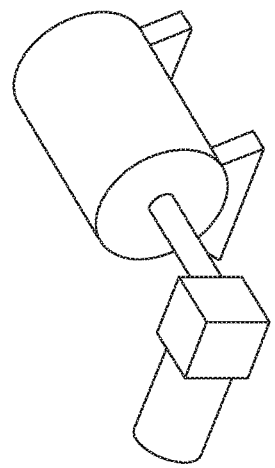
Figure 3E:
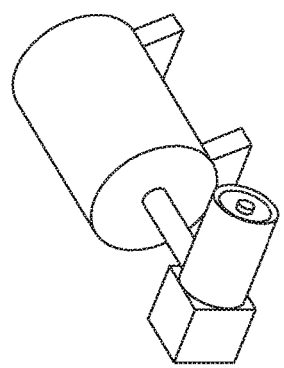
Figure 3A:
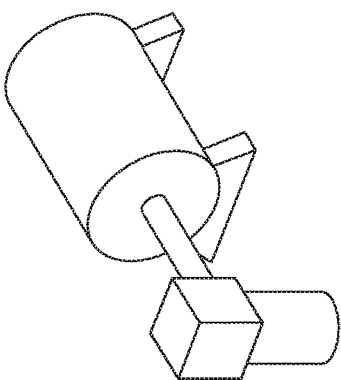
Figure 3D:
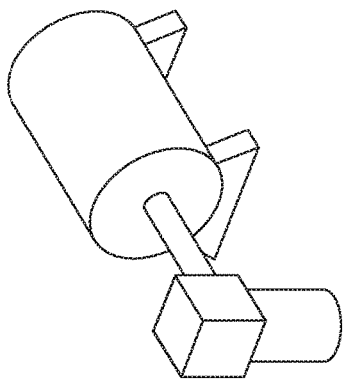

FIG. 2 illustrates an embodiment incorporating an irradiance sensing device affixed to a motor 203 and shaft 202. The irradiance sensing device can include an irradiance sensor 201 disposed within a sensor housing 211. The irradiance sensor 201 can include, for example, a semiconductor and/or optical fiber photodiode, a fast-response thermopile detector, a photovoltaic reference cell, a photovoltaic module, or any combination thereof. The sensor housing 211 is affixed to a shaft 202. The shaft 202 is affixed to the motor 203.

Figure 5:
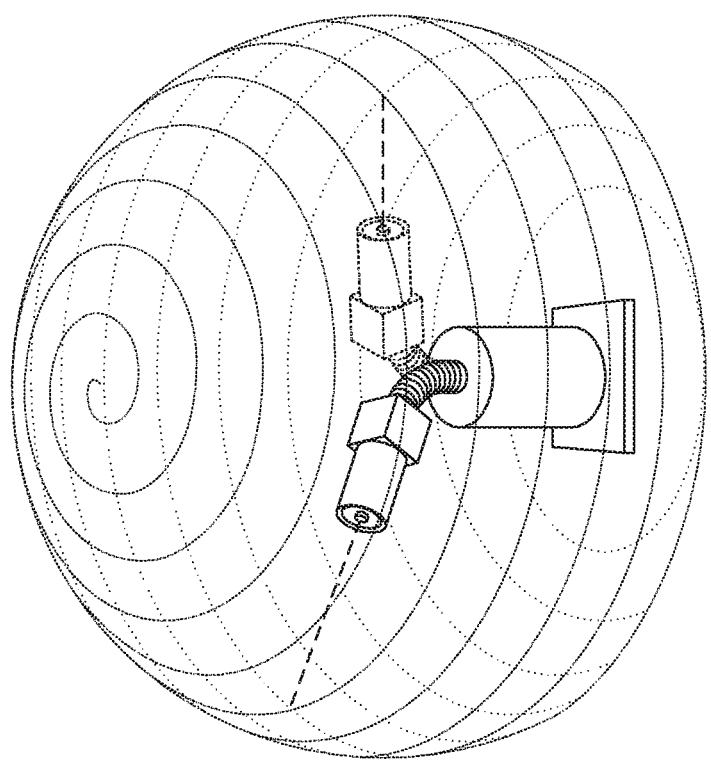
FIG. 5 illustrates an irradiance sensor configured to scan an entire spherical environment, according to an embodiment.
Figure 6:
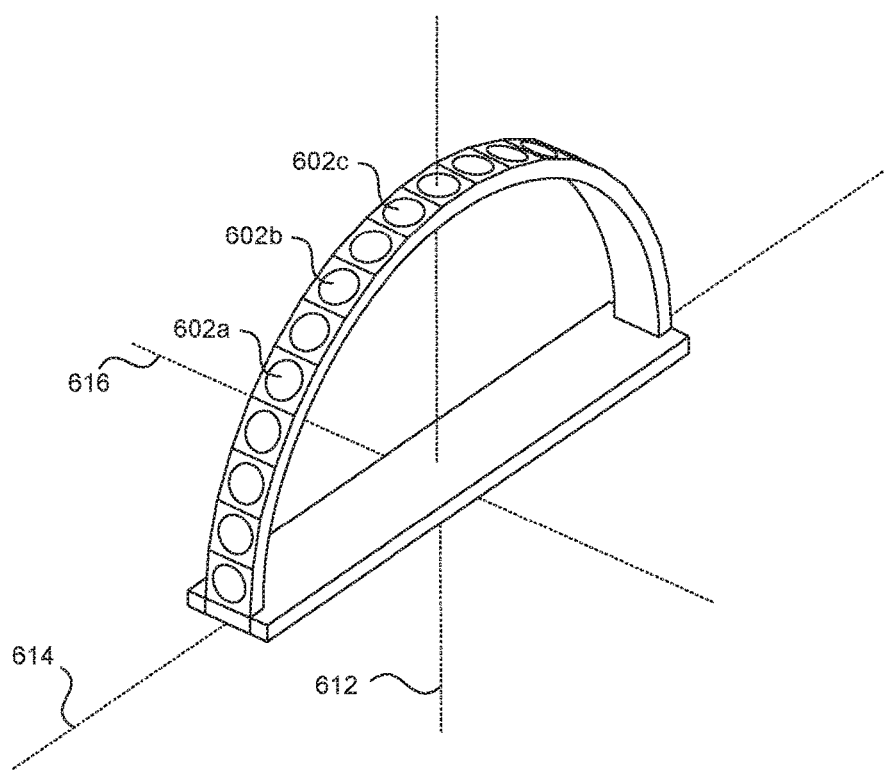
FIG. 6 illustrates a semicircular mount including multiple discrete irradiance detectors, according to an embodiment.
Figure 7A:
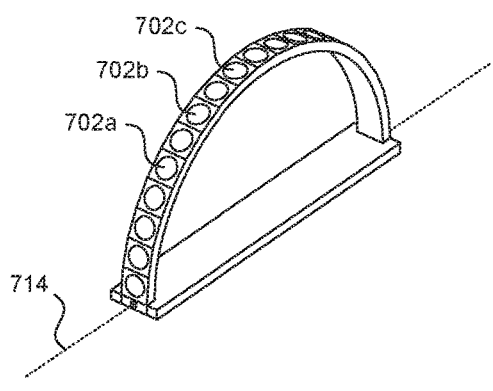
FIGS. 7A-7D illustrate the semicircular mount including multiple discrete irradiance detectors configured to scan an entire spherical environment, according to an embodiment.
Figure 7B:
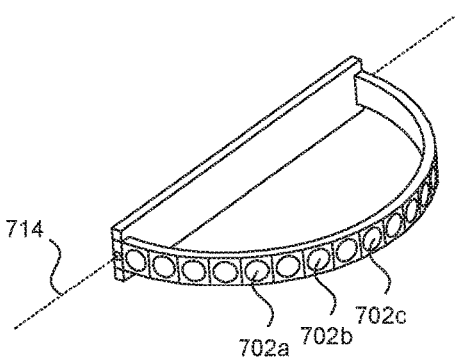
Figure 7C:
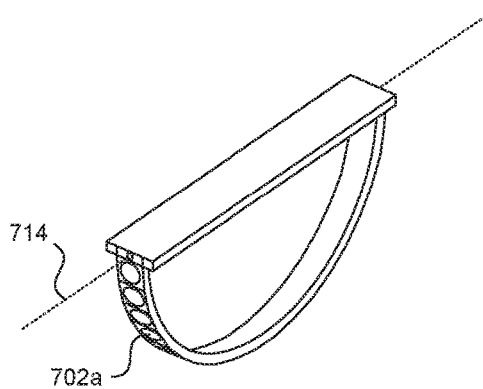
Figure 7D:
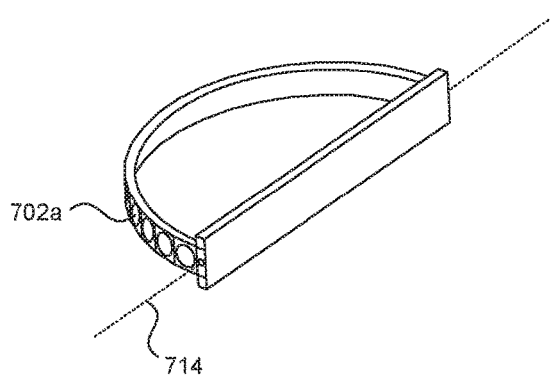

The motor 203 can be configured to convert electrical energy to a mechanical force (e.g., a rotary force). For example, the motor 203 can cause the shaft 202 to rotate about an axis (e.g., axis 205). The motor 203 and/or another motor can be configured to convert electrical energy to a second mechanical force (e.g., a rotary force around a second axis). The motor or motors can cause rotation about a first and/or second axis for a single sensor device, as illustrated in FIG. 5, or about a single axis in a multi-sensor design as illustrated in FIG. 6.

Various irradiance sensor types are contemplated. The irradiance sensor can include, for example, a photodiode, a photometer, a pyranometer, a photovoltaic reference cell, a photovoltaic module, or any combination thereof. The pyranometer can include, for example, a fast-response response thermopile detector. The irradiance sensor can be responsive to an entire solar irradiance spectrum or a subset of the solar radiation spectrum. Multiple photodiode and/or thermopile detectors may be included within the irradiance sensor. The irradiance sensor (e.g., photodiode pyranometer and/or photometer) can include materials from any one or more of Group IV semiconductors (e.g., silicon, germanium, etc.), an alloy of Group IV semiconductors (e.g., SiGe, SiC, GeC, GeSn, etc.), Group III-V semiconductor compounds, or any combination thereof. The irradiance sensor (e.g., photodiode pyranometer and/or photometer) can include one or more dopants (e.g., within a dopant diffusion barrier layer) such as, for example, boron and/or phosphorus.

The photovoltaic reference cell can include an enclosure, photovoltaic device, temperature sensor, and protective window. The photovoltaic reference cell can be configured to mimic properties of a full-scale photovoltaic module in a solar farm. For example, a photovoltaic reference cell can be calibrated to correspond with spectral absorption and angular response characteristics of a full-scale photovoltaic device. For example, a mono-crystalline silicon reference cell with a quartz protective window can be used to correspond with a full-scale cadmium indium gallium di-selenide photovoltaic device. Correspondence between the photovoltaic reference cell and the full-scale photovoltaic can be determined based on a threshold spectral mismatch factor. Utilizing a photovoltaic reference cell having a corresponding spectral absorption with a full-scale photovoltaic device can enable collection of irradiance data specific to devices within a solar farm.

Figure 11:
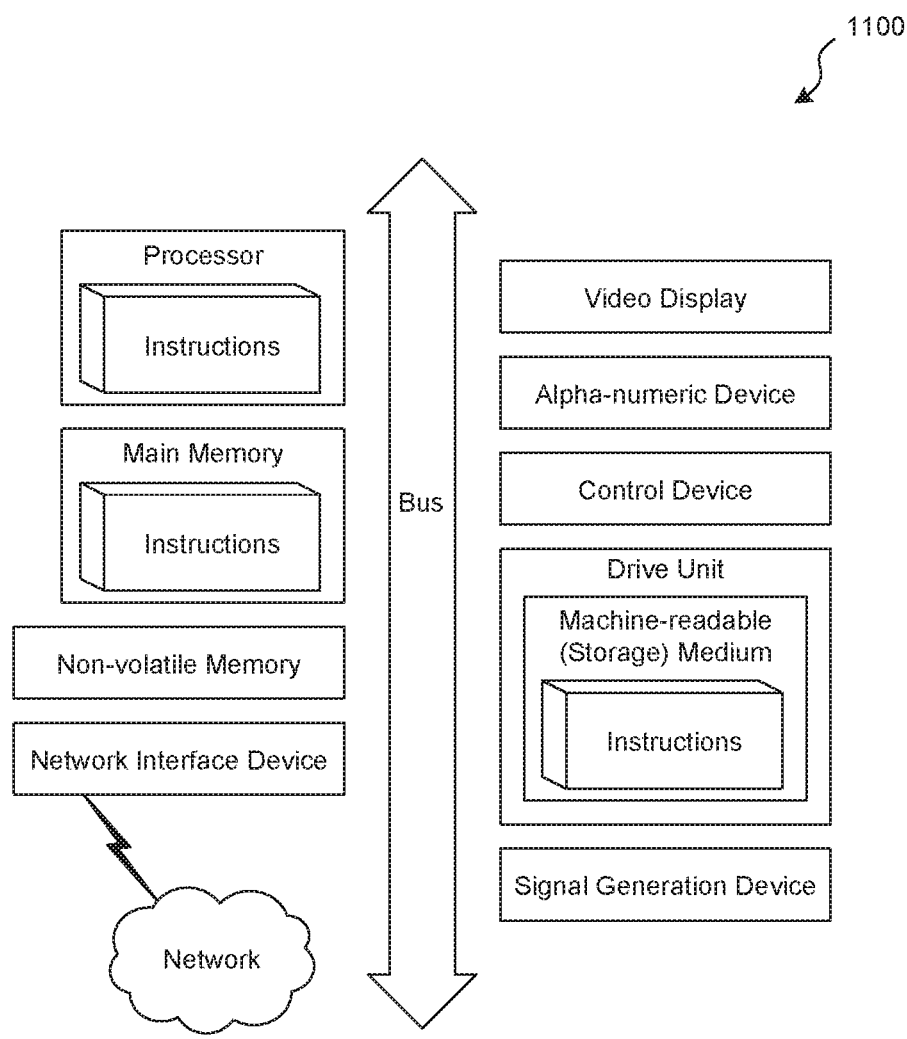
FIG. 11 is a diagrammatic representation of a computer system within which the above-described apparatus may be implemented, and within which a set of instructions for causing the machine to perform any one or more of the methodologies or modules discussed herein may be executed.

The irradiance sensing device can be connected to a computer system (e.g., computer system 1100 of FIG. 11). The computer system can be integrated into a solar plant control system (PCS) or be a distinct computer system. The computer system can receive data from the irradiance sensing device and associated geospatial orientation sensors. The received data can be indicative of irradiance measurements associated with an angle in which the measurement is taken. The computer system can use the received data to determine a maximum irradiance among a plurality of angles, and can also store a record of all measurements over time for additional analyses and plant optimization purposes. The computer system can use the irradiance data to determine maximum irradiance from opposing planes (e.g., for a bi-facial photovoltaic system).

FIGS. 3A-3F show the irradiance sensor device of FIG. 2 with the sensor oriented at various tilt angles. The center of the sensor's field of view changes as it moves or rotates, for example, from vertically downward (e.g., as in FIG. A), to due east (e.g., as in FIG. B), to vertically upward (e.g., as in FIG. C), to upward and westward (e.g., as in FIG. D), to due west (e.g., as in FIG. E), and back to vertically downward (e.g., as in FIG. F). In an example, a small obstruction can exist within a portion of the scanning frame (e.g., positioned downward) such that the sensor scans irradiance over less than 360 degrees (e.g., 350 degrees, 340 degrees, etc.).

The irradiance sensing pyranometer can perform multiple plane-of-array irradiance measurements as it rotates around the axis of rotation. The irradiance and associated angular orientation measurements can be used to generate an irradiance versus orientation map along the geometric measurement path. The geospatial orientation refers to an orientation of a device associated with a resting position of the device with respect to a surface of the Earth (e.g., on approximately flat ground, on a rooftop, above a parking lot, etc.). The irradiance map can include an irradiance gradient. The irradiance gradient can describe a rate of change of irradiance from a first angle to a second angle. The irradiance gradient can be used, for example, to determine an irradiance corresponding to an angle lacking an irradiance measurement.

FIGS. 3G-3J show an irradiance sensor device with the irradiance sensor oriented at various tilt angles. The irradiance sensor device can include, for example, a photovoltaic reference cell. The center of a field of view of the photovoltaic reference cell can move through a range of tilt angles (e.g., a 90 degree range, a 180 degree range, 360 degree range, or any range therebetween). For example, the center of a field of view of the photovoltaic reference cell can rotate completely (e.g., 360 degrees) about an axis or partially about an axis. For example, the center of a field of view of the photovoltaic reference cell can change from horizontal (not shown), to a first tilt angle (e.g., approximately 45 degrees as shown in FIG. 3G), to a second tilt angle (e.g., approximately 60 degrees as shown in FIG. 3H), to a third tilt angle (e.g., approximately 80 degrees as shown in FIG. 3I), to a fourth tilt angle (e.g., approximately 90 degrees as shown in FIG. 3J).

Figure 4A:
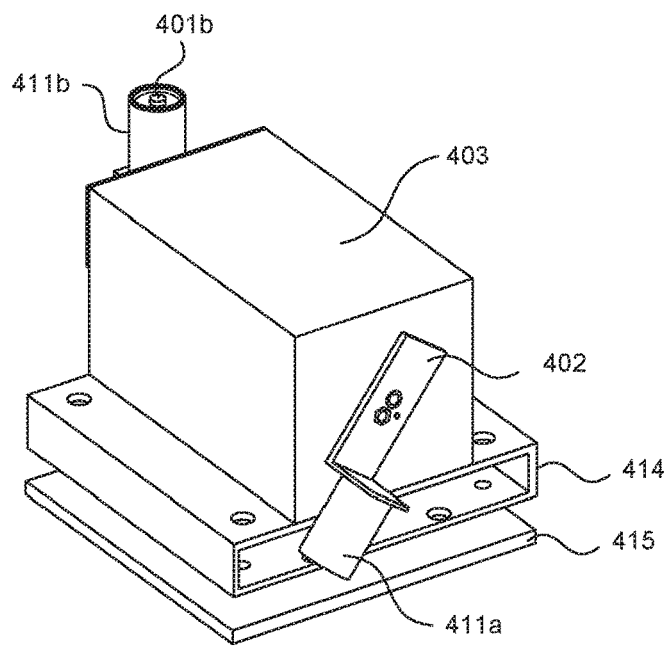
FIGS. 4A-4B illustrate an irradiance sensor affixed to a rotational shaft, according to an embodiment.
Figure 4B:
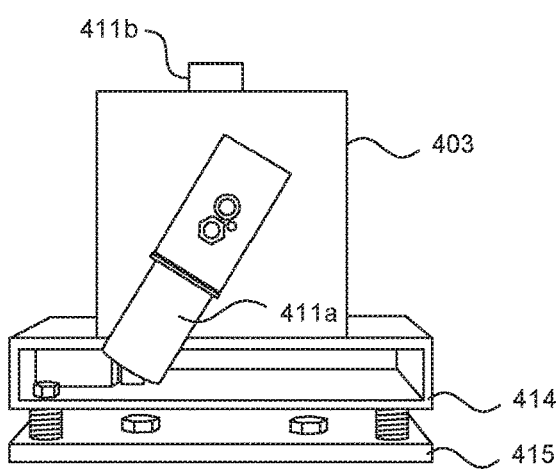

FIGS. 4A-4B illustrate an irradiance sensor device, according to an embodiment. The irradiance sensor device can include one or more irradiance sensors disposed on one or more sensor housings (e.g., sensor housings 411a and 411b), a motor housing 403, a sensor mount 402 affixed to a rotational motor shaft (not shown), a motor housing base 414, and a leveling plate 415. An irradiance sensor housing 411a can be affixed to a rotational mount 402 which is in turn affixed to a motor shaft (not shown). An irradiance sensor housing 411b can be affixed to an adjustable horizontal mount. The rotational shaft and/or adjustable horizontal mount can be affixed to the motor housing 403. The motor housing 403 can be affixed to the motor housing base 414.

The motor housing base 414 and leveling base 415 can be configured to align the irradiance sensor(s) with the changing angle of a full-scale photovoltaic device. For example, the motor housing base 414 and leveling plate 415 can include screws configured to adjust the relative planar orientations of the motor housing base 414 and leveling base 415.

The irradiance sensor affixed to the rotating sensor mount 402 can be used to scan irradiances along a circular (or semi-circular) path. In an embodiment, the rotating sensor mount 402 is configured to rotate around a complete 360-degree circle such that the irradiance sensor can scan irradiances along a complete circle. In another embodiment, the rotating sensor mount 402 is configured to rotate around an incomplete circle (e.g., approximately 350 degrees, 340 degrees, etc.) such that the irradiance sensor can scan irradiances along a partial circle. The rotating senor mount 402 may rotate around an incomplete circle if, for example, an obstruction (e.g., the motor and/or leveling plate) prevents complete motion. The rotating sensor mount 402 may rotate around an incomplete circle to omit an irradiance scan of a region impacted by a shadow of the machine itself. For example, a region directly below and adjacent to the irradiance sensor device may include a shadow cast by the irradiance sensor device. Accordingly, irradiance scan data from this region may be omitted to reduce the influence that the irradiance sensor device has on the detected irradiances.

FIG. 5 illustrates an irradiance sensor configured to scan an entire spherical environment, according to an embodiment. The irradiance sensor can scan an entire spherical environment surrounding the sensor or substantially all the spherical environment surrounding the sensor (e.g., all except for a small obstruction). For example, the irradiance sensor can scan the entire environment except for vertically downward and several degrees extending from the vertically downward position (e.g., due to an obstruction from the motor).

The irradiance sensor can include one or more shafts connecting the motor to the sensor. For example, a first shaft can be affixed to the motor and configured to receive a rotational force from the motor. A second shaft can be affixed to the first shaft via a mechanical joint. The mechanical joint between the first and second shafts can enable the first and second shafts to bend along an axis perpendicular to the length of the first and second shafts.

The irradiance sensor can scan the spherical environment by rotating in a helix pattern. For example, the irradiance sensor can initiate a scan in an upward vertical position and begin to rotate. As the rotation begins, the mechanical joint between the first and second shafts gradually begins to bend. Bending of the mechanical joint orients the irradiance sensor toward planes below the upward vertical position that continually drop further down in a helix pattern such that irradiance planes are captured across an entire (or substantially entire) spherical environment surrounding the irradiance sensor. A lower portion (e.g., vertically downward plane) may not be captured due to an obstruction from the motor and/or bending limitation of the mechanical joint.

In an embodiment, any of the devices illustrated in FIGS. 2-5 can be configured to scan an entire spherical environment. For example, in FIG. 4A, the illustrated device can include a rotatable mount incorporated into the leveling plate 414. The rotatable mount can be connected to the motor 403. The motor 403 can apply a rotational force to the rotatable mount to cause the motor (and irradiance sensor affixed to shaft 402) to rotate about a vertical axis. Thus, the sensor affixed to the shaft 402 can capture irradiances from a first scan (e.g., a 360 degree scan) in a first orientation and a second scan (e.g., a 360 degree scan) in at least a second orientation. The second orientation can be obtained by rotating around the vertical axis such that second scan captures irradiance from a circular region substantially uncovered by a previous scan (e.g., except for an intersecting point that may have been previously scanned). Various other scanning paths are contemplated including, for example, rotating about around the vertical axis while initiating a scan at a vertical orientation and slowly lowering the shaft 402 to capture irradiance by rotating in a helix pattern.

FIG. 6 illustrates multiple irradiance detectors (e.g., detectors 602A, 602B, and 602C) fixed at multiple angular intervals along a semi-circular frame. The semi-circular frame includes a centerline that is parallel to the rotational axes of single axis tracking module racks of a photovoltaic system. In an embodiment, the number of detectors and tilt angles at which measurements can be made can vary with the required angle resolution (e.g., 180 for 1 degree resolution, 360 for ½ degree resolution, etc.). In an embodiment, the number of detectors and tilt angles at which measurements can be made can be less than a required angle resolution (e.g., 90 for 1 degree resolution, 180 for ½ degree resolution, etc.) and intermediary irradiance values can be extrapolated. For instance, an irradiance map can be generated indicative of an irradiance gradient over the plurality of measured angles. A rate of change of the irradiance from a first angle (e.g., an angle of detector 602A) to a second angle (e.g., an angle of detector 602B) can be used to determine irradiance at any incremental angle (e.g., 1 degree, ½ degree, 0.1 degree, 0.001 degree, etc.) between the first angle and the second angle.

FIGS. 7A-7D illustrate the semicircular multiple irradiance detector embodiment of FIG. 6 configured to scan an entire spherical environment, according to an embodiment. A semi-circular framed irradiance detector can be affixed to a rotatable mount to rotate the semi-circular frame around an axis (e.g., axis 712, axis 714, and/or axis 716). The rotatable axis can enable the sensor (e.g., sensor 702a, sensor 702b, and/or sensor 702c) to measure solar irradiance at additional angles. For example, the semi-circular frame can rotate around axis 714 to capture solar irradiance measurement data around a hemispherical region, around a near-complete spherical region, or around a complete spherical region. In another example, the semi-circular frame can rotate on axis 714 to capture solar irradiance measurement data for low sun angles (e.g., during the winter and/or for high latitude regions).

Figure 8:
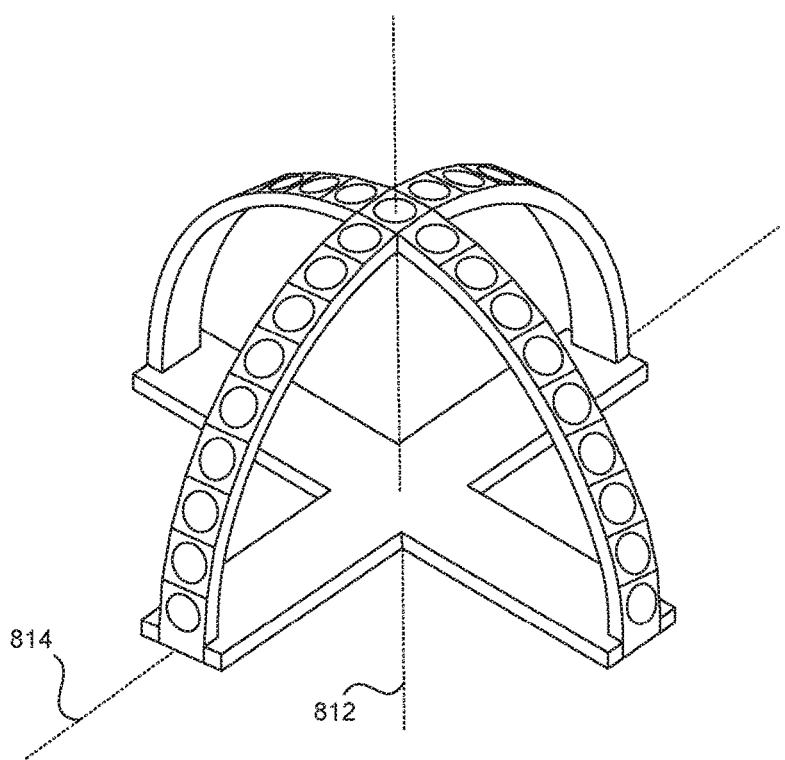
FIG. 8 illustrates dual semicircular mounts including irradiance detectors, according to an embodiment.

FIG. 8 illustrates dual semicircular frames including irradiance detectors, according to an embodiment. The irradiance detectors can be positioned in a plurality of orientations. An angle of solar irradiance can be extrapolated based on irradiance data generated by any of the irradiance detectors. Solar irradiance data from the irradiance detectors can be used to generate a solar irradiance gradient map. The solar irradiance gradient map can be used to identify a maximum solar irradiance angle. For example, a maximum solar irradiance angle between a first semicircular mount and a second semicircular mount can be identified based on the solar irradiance gradient map even if a direct measurement of the identified maximum angle is not taken.

In an embodiment, the dual semicircular frames can be affixed to a rotatable mount to rotate the dual semicircular frames around an axis (e.g., axis 812 and/or axis 814). The irradiance detectors disposed along the dual semicircular frames can be rotated to take a direct measurement of solar irradiance in any angle. For example, the rotational axis can be positioned in a center of a base element and allow the dual semicircular frames to rotate around a hemispherical region, around a near-complete spherical region, or around a complete spherical region.

Figure 9:
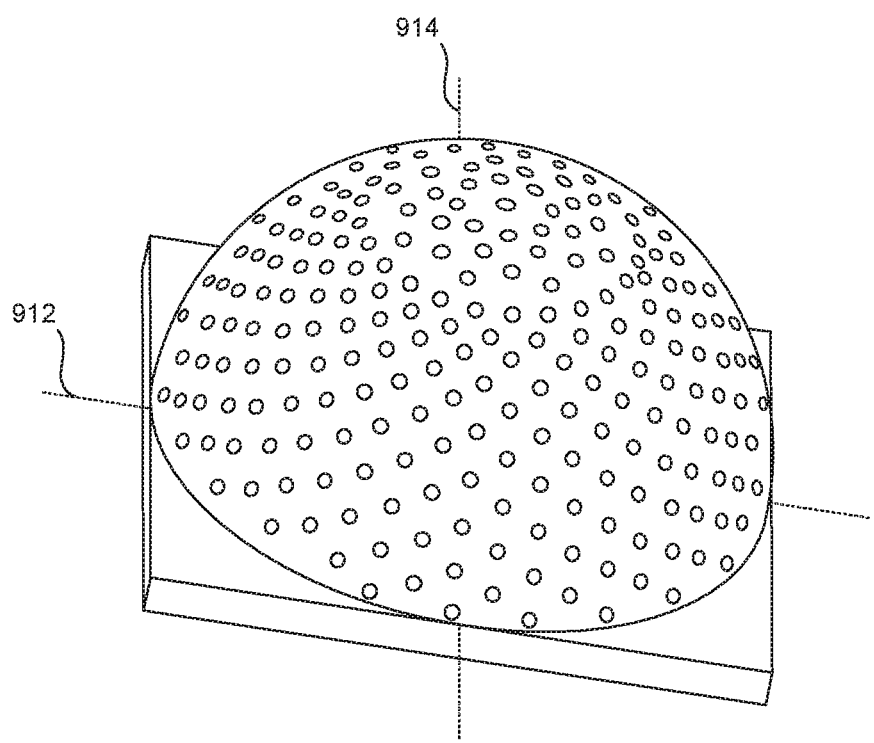
FIG. 9 illustrates a hemispherical dome including irradiance detectors, according to an embodiment.

FIG. 9 illustrates a hemispherical dome including irradiance detectors, according to an embodiment. Multiple irradiance detectors can be arranged on a hemispherical dome. Each detectors can be oriented in a unique direction corresponding to an orientation attainable by a two-axis tracking module rack of a photovoltaic system.

In an embodiment, the hemispherical dome can be affixed to a rotatable mount to rotate the hemispherical dome around an axis (e.g., axis 912 and/or axis 914). The irradiance detectors disposed on the hemispherical dome can be rotated to take a direct measurement of solar irradiance in any angle. For example, the rotational axis can be positioned in a center of a base element and allow the hemispherical dome to rotate around a hemispherical region, around a near-complete spherical region, or around a complete spherical region.

In an embodiment, multiple irradiance detectors can be arranged on a spherical dome. Each detectors can be oriented in a unique direction corresponding to an orientation attainable by a two-axis tracking module rack and/or a bi-facial photovoltaic system.

Figure 10:
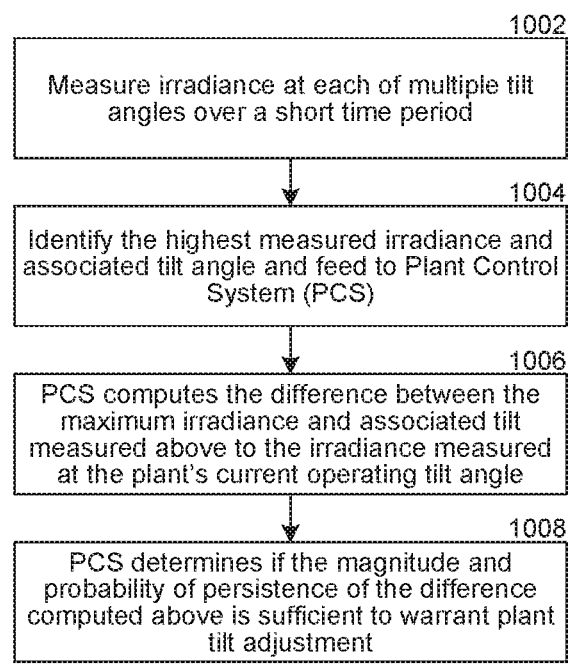
FIG. 10 is a flow chart of a method for determining whether to adjust an orientation of a photovoltaic module, according to an embodiment.

FIG. 10 is a flow chart of a method for determining whether to adjust an orientation of a photovoltaic module, according to an embodiment. One or more irradiance sensors within a proximity to a photovoltaic module can measure irradiance corresponding to one or more tilt angles of the photovoltaic module. The measured irradiance can be stored as raw data or partially processed using an irradiance map to determine an irradiance of one or more intermediate angles. Raw and partially processed irradiance data can be fed to a solar plant control system (PCS). A maximum measured and/or determined irradiance associated with a tilt angle can be determined. A difference between an angle associated with the maximum irradiance and an angle of a current position of a photovoltaic module is determined. A magnitude and probability of persistence of the maximum irradiance is determined. If the magnitude and probability of persistence of the maximum irradiance exceeds a threshold, the system causes the photovoltaic panel to tilt toward the maximum solar irradiance.

In an embodiment, a single photodiode (e.g., a silicon and/or germanium photodiode) or fast-response thermopile pyranometer can mounted in such a way as to allow the center of its hemispherical field of view to move from horizon (e.g., approximately Eastward) to the opposite horizon (e.g., approximately Westward), move around a 360 degree circle, or move around a complete spherical environment. An included measurement and control system periodically initiates such movements while multiple measurements of the total irradiance striking the pyranometer from within its field of view, and the associated pyranometer tilt angles are also captured by an included measurement and control system. This implementation can appear as in FIG. 2, where the pyranometer (and, when included, an accelerometer, shaft positioning encoder or similar component) is mounted on a motor's shaft to control and record the required rotational motion. Utilizing a single sensor to detect irradiance at various angles can ensure that reliably comparable measurements are being taken without requiring comparative calibrations to quantify sensor variations if multiple different sensor are used. Thus, using a single sensor to cover a large area (e.g., an entire spherical environment) is advantageous.

Another implementation includes using multiple irradiance sensors each fixed at a different tilt angle as in FIG. 6.

The number of detectors shown in FIG. 6 is for illustrative purposes only, and may vary depending on analytical or tracking precision limitations or requirements. The included measurement and control system will periodically record nearly simultaneous measurements from all sensors. This implementation may also include a protective cover or enclosure to minimize the effect of uneven or variable soiling of the multiple detectors, and or enhanced analytical capability enabling dynamic recalibration to compensate for relative error resulting from uneven soiling.

Various implementations may further include the ability to dynamically vary the sampling rates in response to the rate of change of incident irradiance.

FIG. 11 is a diagrammatic representation of a machine in the example form of a computer system 1100 within which a set of instructions, for causing the machine to perform any one or more of the methodologies or modules discussed herein, may be executed. For example, the computer system 1100 can determine an angle corresponding to a maximum irradiance based on a determined irradiance gradient.

In the example of FIG. 11, the computer system 1100 includes a processor, memory, non-volatile memory, and an interface device. Various common components (e.g., cache memory) are omitted for illustrative simplicity. The computer system 1100 is intended to illustrate a hardware device on which any of the components described in the example of FIGS. 1-10 (and any other components described in this specification) can be implemented. The computer system 1100 can be of any applicable known or convenient type. The components of the computer system 1100 can be coupled together via a bus or through some other known or convenient device.

This disclosure contemplates the computer system 1100 taking any suitable physical form. As example and not by way of limitation, computer system 1100 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 1100 may include one or more computer systems 1100; be unitary or distributed; span multiple locations; span multiple machines; or reside in a cloud, which may include one or more cloud components in one or more networks. Where appropriate, one or more computer systems 1100 may perform without substantial spatial or temporal limitation one or more steps of one or more methods described or illustrated herein. As an example and not by way of limitation, one or more computer systems 1100 may perform in real time or in batch mode one or more steps of one or more methods described or illustrated herein. One or more computer systems 1100 may perform at different times or at different locations one or more steps of one or more methods described or illustrated herein, where appropriate.

The processor may be, for example, a conventional microprocessor such as an Intel Pentium microprocessor or Motorola PowerPC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer system 1100. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, storing an entire large program in memory may not even be possible. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 1100. The interface can include an analog modem, ISDN modem, cable modem, token ring interface, satellite transmission interface (e.g., "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 20 reside in the interface.

In operation, the computer system 1100 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling others skilled in the relevant art to understand the claimed subject matter, the various embodiments, and the various modifications that are suited to the particular uses contemplated.

While embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Although the above Detailed Description describes certain embodiments and the best mode contemplated, no matter how detailed the above appears in text, the embodiments can be practiced in many ways. Details of the systems and methods may vary considerably in their implementation details, while still being encompassed by the specification. As noted above, particular terminology used when describing certain features or aspects of various embodiments should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless those terms are explicitly defined herein. Accordingly, the actual scope of the invention encompasses not only the disclosed embodiments, but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

The invention claimed is:

1. An irradiance detection system to rapidly measure radiant energy flux striking planes of multiple differing geospatial orientations comprising:
   an irradiance sensor with a hemispherical field of view affixed to a mount apparatus;
   the mount apparatus including an actuator to change an orientation of the irradiance sensor by rotating the irradiance sensor about an axis;
   an orientation monitoring device configured to measure the orientation of the irradiance sensor during each irradiance measurement; and
   a processor configured to:
      control motion of the mount apparatus;
      cause the irradiance sensor to capture irradiance sensor measurements as the mount apparatus moves; and
      record the irradiance sensor measurements and geospatial orientations associated with the irradiance sensor measurements.

2. The irradiance detection system of claim 1, wherein the processor is further configured to:
   monitor the orientation of the rotatable mount as an actuator causes the shaft to rotate about the axis based on data collected from the orientation monitoring device, the monitored orientation of the rotatable mount being associated with a sensor plane;
   associate the monitored orientation with the irradiance measurements such that each irradiance measurement corresponds with a particular sensor plane among a range of sensor planes; and
   determine a plane corresponding to a peak value among the irradiance measurements, the plane being determined based on the sensor planes associated with the irradiance measurements.

3. The irradiance detection system of claim 2, wherein the plane corresponding to the peak value is determined by an irradiance gradient map generated based on the irradiance measurements.

4. The irradiance detection system of claim 2, wherein the processor is further configured to:
   generate an irradiance gradient map indicative of a rate of change of irradiance over a continuous series of planes, the irradiance gradient map being generated based on the irradiance measurements.

5. The irradiance detection system of claim 4, wherein the processor is further configured to:
   predict an irradiance for a plane between measured sensor planes based on a sequence of time-series irradiance gradient maps.

6. The irradiance detection system of claim 5, wherein the processor is further configured to:
   estimate a probability that a current or recently traversed irradiance distribution corresponding to the peak value will persist for a time period based on a determined progression of the sequence of time-series irradiance gradient maps.

7. The irradiance detection system of claim 1, wherein the irradiance sensor includes a photodiode pyranometer, a photometer, a thermophile pyranometer, a photovoltaic reference cell, a photovoltaic module, or any combination thereof.

8. The irradiance detection system of claim 1, wherein the change of orientation of the irradiance sensor mimics a directional and angular motion of a single-axis tracking photovoltaic module.

9. The irradiance detection system of claim 1, wherein the change of orientation of the irradiance sensor mimics a directional and angular motion of a dual-axis tracking photovoltaic module.

10. The irradiance detection system of claim 1, wherein the processor is further configured to:
    communicatively couple with a solar plant control system (PCS) and transmit a command to cause the PCS to adjust a tilt angle of solar cells to correspond with the determined plane.

11. The irradiance detection system of claim 1, wherein the processor is further configured to:
    determine opposite planes corresponding to a combination of peak irradiance values, the opposite planes being determined based on the sensor planes associated with the irradiance measurements.

12. The irradiance detection system of claim 11, wherein the processor is further configured to:
    communicatively couple with a solar plant control system (PCS) and transmit a command to cause the PCS to adjust a tilt angle of bi-facial solar modules to cause opposing surfaces of the bi-facial solar modules to align with the determined opposite planes or maximum combined irradiance.

13. The irradiance detection system of claim 1, wherein a conductive wire is affixed to the sensor housing, the conductive wire being configured to deliver electric power from the irradiance sensor to the actuator.

14. The irradiance detection system of claim 1, wherein the actuator is an electric motor.

15. The irradiance detection system of claim 1, wherein the actuator is configured to cause the irradiance sensor to scan an entire spherical environment.

16. The irradiance detection system of claim 1, wherein the sensor housing includes:
- a semi-circular shape with multiple fixed irradiance sensors distributed at regular intervals along an outer surface of the semi-circular shape;
- a circular shape with multiple fixed irradiance sensors distributed at regular intervals along an outer surface of the circular shape;
- a hemispherical dome shape with multiple fixed irradiance sensors distributed at regular intervals throughout an outer surface of the semi-circular shape; or
- a spherical dome shape with multiple fixed irradiance sensors distributed at regular intervals throughout an outer surface of the hemispherical dome shape.

17. The irradiance detection system of claim 1, wherein the actuator causes the sensor housing having either of a semi-circular shape or a hemispherical dome shape to rotate about an axis such that irradiance sensor disposed on the sensor housing scan an entire spherical environment.

18. The irradiance detection system of claim 1, wherein the actuator causes the sensor housing having a single irradiance sensor to change orientation in a spherical helix pattern such that the single irradiance sensor scans an entire spherical environment.

19. The irradiance detection system of claim 1, further comprising:
- a means to prevent uneven soiling of the surfaces including a moveable protective cover with an automatic cleaning system, wherein upon an irradiance scan cycle comprises the moveable protective cover being opened, measurements being captured, the moveable protective cover being closed, and irradiance sensors being cleaned upon the closing the moveable protective cover such that the irradiance sensors are ready for a subsequent irradiance scan cycle.

20. An irradiance detection for measuring a radiant energy flux of various planes, comprising:
- determine opposite planes corresponding to peak irradiance values, the opposite planes being determined based on the sensor planes associated with the irradiance measurements; and
- communicatively couple with a solar plant control system (PCS) and transmit a command to cause the PCS to adjust a tilt angle of bi-facial solar cells to cause opposing surfaces of the bi-facial solar cells to align with the determined opposite planes;
- a semi-circular shape with irradiance sensors distributed along an outer surface of the semi-circular shape;
- a circular shape with irradiance sensors distributed along an outer surface of the circular shape;
- a hemispherical dome shape with irradiance sensors distributed throughout an outer surface of the semi-circular shape; or
- a spherical dome shape with irradiance sensors distributed throughout an outer surface of the hemispherical dome shape;
- wherein the motor causes the sensor housing having the irradiance sensor to change orientation in a spherical helix pattern such that the irradiance sensor scans an entire spherical environment.

21. A method for detecting irradiance of a surrounding environment, comprising:
- monitoring, by a processor, an orientation of a rotatable mount affixed to an irradiance sensor as an actuator causes the rotatable mount to rotate about an axis, the orientation of the rotatable mount being associated with a sensor plane;
- capturing, via the irradiance sensor, irradiance measurements as the rotatable mount rotates about the axis;
- associating the orientation of the rotatable mount with the irradiance measurements such that each irradiance measurement corresponds with a particular sensor plane among a range of sensor planes; and
- determining a plane corresponding to a peak irradiance value, the plane being determined based on the sensor planes associated with the irradiance measurements.

22. The method of claim 21, wherein the monitoring includes analyzing data received from an orientation monitoring device affixed to a housing of the irradiance sensor to determine the orientation of the rotatable mount.

23. The method of claim 21, wherein the particular sensor plane corresponds to a field of view of the irradiance sensor.

24. The method of claim 21, further comprising:
- determining the particular sensor plane among the range of sensor planes based on the monitored orientation of the rotatable mount.

25. The method of claim 21, wherein determining the plane corresponding to the peak irradiance value comprises iteratively evaluating irradiance values for opposing planes within a range of motion of a bi-facial solar cell to identify opposing planes resulting in a maximum total irradiance.

* * * * *